United States Patent [19]

Ferguson et al.

[11] 4,174,995

[45] Nov. 20, 1979

[54] SEVERING AND SEALING TOOL

[75] Inventors: Sammy J. Ferguson, Dallas; William R. Yohe, Garland, both of Tex.

[73] Assignee: Recognition Equipment Incorporated, Dallas, Tex.

[21] Appl. No.: 879,971

[22] Filed: Feb. 22, 1978

[51] Int. Cl.$^2$ ........................ B32B 31/00; B30B 15/34

[52] U.S. Cl. .................................... 156/494; 156/515; 156/583.9

[58] Field of Search ............... 156/515, 494, 251, 583; 93/DIG. 1

[56] References Cited

U.S. PATENT DOCUMENTS

| | | | |
|---|---|---|---|
| 3,234,072 | 2/1966 | Dreeben | 156/515 |
| 3,271,560 | 9/1966 | Schott | 156/515 |
| 3,493,456 | 2/1970 | Vilutis | 156/515 |
| 4,119,449 | 10/1978 | Gould | 156/515 |

*Primary Examiner*—Douglas J. Drummond
*Attorney, Agent, or Firm*—John E. Vandigriff

[57] ABSTRACT

A severing and sealing tool having a single head with electrically resistive wires passing there across. The wires are connected to an electric source which provides power selectively to the wires for severing and sealing a thermoplastic material such as a strap along an overlapping portion thereof. The electrically resistive wire is heated to a temperature sufficiently high to melt the thermoplastic material, but not high enough to decompose the material. The metallic body of the tool is formed in two parts with an insulating material disposed between the two parts with the electrically resistive wires having an end connected to each of the parts. One electrically resistive wire traverses completely across the predetermined area of the head which comes in contact with the thermoplastic material. The other electrically resistive wire meanders through a part of the predetermined area of the head which is in contact with the thermoplastic material. Electrical energy is supplied to each of the two parts of the body of the tool and the electrically resistive wires are insulated except at their ends from the metallic substance of the tool for providing the necessary electrical circuit to provide electrical power to the electrical resistive wires thereby heating the wires.

8 Claims, 23 Drawing Figures

SEVERING AND SEALING TOOL

BACKGROUND OF THE INVENTION

I. Field of the Invention

The invention relates to severing and sealing tools for cutting and sealing thermoplastic material, and, more particularly, this invention relates to cutting and sealing tools for thermoplastic material which have two electrical resistive wires, one wire for severing the thermoplastic material which is under tension and the other sealing the layers of thermoplastic material together.

II. Description of the Prior Art

Reference is made to the following U.S. Patents: U.S. Pat. No. 3,245,294 issued to Butler et al on Apr. 12, 1966 and entitled "Means For and Method of Cutting Thermal Plastic Materials;" and U.S. Pat. No. 3,064,111 issued to Newman on Nov. 13, 1962 and entitled "Plastic Cutting Device."

The Butler Patent shows a heated tip which is utilized to cut a thermoplastic material by applying heat to the tip to bring the tip to the softening temperature of the thermoplastic material. After the cutting operation, an impulse of heat is applied to the tip to heat it above the decomposition temperature of the material to clean the tool. The Butler patent is particulary adaptable to cutting a thermoplastic material which is disposed between two rigid structures (as shown in FIG. 4 of the patent).

The Newman patent is of more interest because it shows the utilization of electrically resistive wires through which current is passed in order to heat the wires for cutting a thermoplastic material. In the Newman patent, the cutting wire is moved basically perpendicular to the thermoplastic material during the cutting operation and the electrically resistive wire is heated to a temperature which is within the softening range of the thermoplastic material. The cutting of the thermoplastic material is accomplished by softening the plastic material by the use of heat and severing the material by the sawing action of the thin wire through the material.

It is known to cut plastic through the use of heated blades or wires. It is also known to seal plastic strips together by utilizing friction heat to melt or fuse the overlapping portion of the strap, i.e., the overwrapped or two-layer portion of the strap, together. Sufficient heat is applied to the strap by means of friction in U.S. Pat. No. 3,654,033 issued to Angarola on Apr. 4, 1972 and entitled "Strap Tensioning and Sealing Tool"to accomplish the sealing operation. The Angarola patent further shows cutting of the portion of the strap between the overlapping portion and the supply somewhere adjacent to the overlapping portion prior to the sealing of the strap. The Angarola patent further shows placing the strap in tension around the object to be wrapped by placing tension on the portion of the strap toward the strap supply.

Other patents, which are of some interest, known to the applicants are, U.S. Pat. No. 3,985,996 issued to Fischer on Oct. 12, 1976 and entitled "Thermal Cutting Apparatus," U.S. Pat. No. 3,892,024 issued to VanZyl on Jul. 1, 1975 and entitled "Articles of Cutlery, Paint Scrapper and the Like," U.S. Pat. No. 4,014,229 issued to Lynch on Mar. 29, 1977 and entitled "Film Dispenser and Cut Off," U.S. Pat. No. 4,018,117 issued to Patterson on Apr. 19, 1977 and entitled "Cutting Method and Machine Employing Heated Reciprocating Wire," U.S. Pat. No. 2,987,598 issued to Chance et al on Jun. 6, 1961 and entitled "Devices for Severing Plastic Material," U.S. Pat. No. 2,711,779 issued to Carlan on June 28, 1955 and entitled "Method and Apparatus for Severing and Joining Layers of Thermal Plastic Material," U.S. Pat. No. 3,035,631 issued to Knowles on May 22, 1962 and entitled "Heating Tip for Welding of Plastics," U.S. Pat. No. 2,477,040 issued to Brown et al on July 26, 1949 and entitled "Sewing Machine for Thermal Plastic Materials," and U.S. Pat. No. Re.21070 issued to Raffles on May 2, 1939 and entitled "Heating Element".

None of the prior constructions known in the art shows a heating tool adapted for cutting and sealing thermoplastic material, which is overlapping and which is also under tension, by utilizing electrically resistive wires disposed across a single tool head with both of the electrically resistive wires being heated to the softening temperature of the thermoplastic material.

SUMMARY OF THE INVENTION

The invention as shown herein is a severing and sealing tool which is brought into contact with an overlapping portion of thermoplastic material for severing and sealing the layers of the thermoplastic material together and may be used in conjunction with the strapping apparatus disclosed in copending U.S. application Ser. No. 879,986, filed Feb. 22, 1978. A predetermined area of the head comes in contact with the thermoplastic material. The layer of the overlapping portion adjacent to the head is under tension. Two electrically resistive wires are disposed on the head within the predetermined area. One of the electrically resistive wire crosses the predetermined area for cutting the thermoplastic material along its width. The other wire meanders through a certain portion of the predetermined area in order to provide the heat necessary to cause the layers of thermoplastic material to fuse, join, or melt together. The thermoplastic material, such as a strap wrapped about an article with the free end of the strap overwrapped, is under tension so that the layers are held tightly together and the portion of the strap extending from the overlapping portion toward the supply of the strap is under tension.

DESCRIPTION OF THE PREFERRED EMBODIMENT

Figure 1:
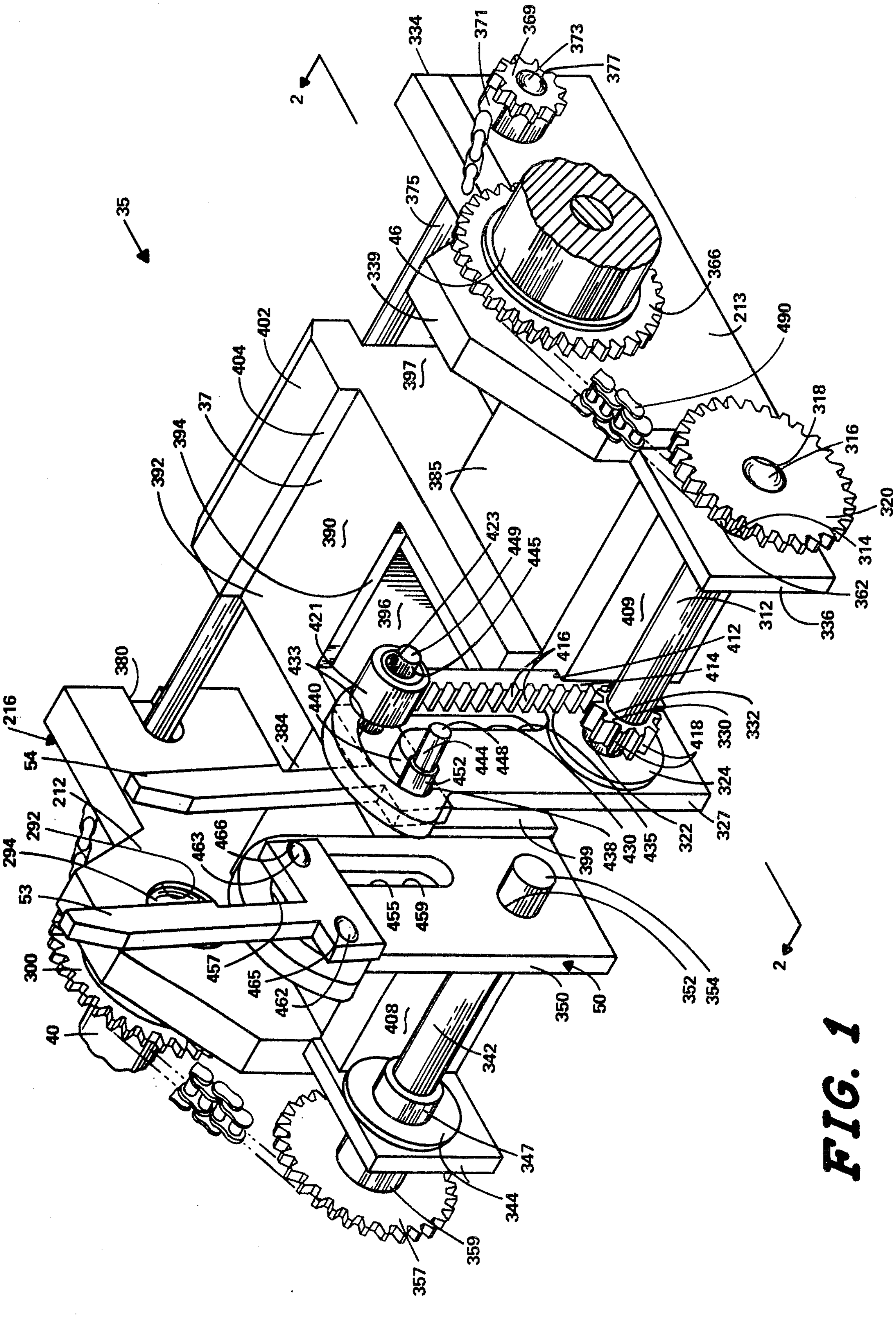
FIG. 1 is a view in perspective of a portion of a strapping apparatus utilized with a severing and sealing tool constructed according to the present invention.

Referring to the drawings, a strapping apparatus (generally designated 35) of a general bailing system has the apparatus embodying the invention position therein. It being understood that the apparatus 35 shown herein may be of various sizes, dimensions and output designs for operation within systems of varying input requirements and dimensions. With reference to the drawings and, more particularly, to FIG. 1 thereof, a part of the strapping apparatus 35 is shown. A platen 37 is rotated by a shaft 40. The platen is pivotal about an axis of rotation defined by shaft 40 and 46 (the function of which will be explained in detail hereinafter). A clamp 50 which is movable with the platen 37 is located adjacent thereto. The clamp means has fingers 53 and 54 which are movable to hold an object 57 (FIG. 2) against the platen 37. Prior to describing FIG. 1 in detail a discussion of FIG. 2 is helpful.

Figure 2:
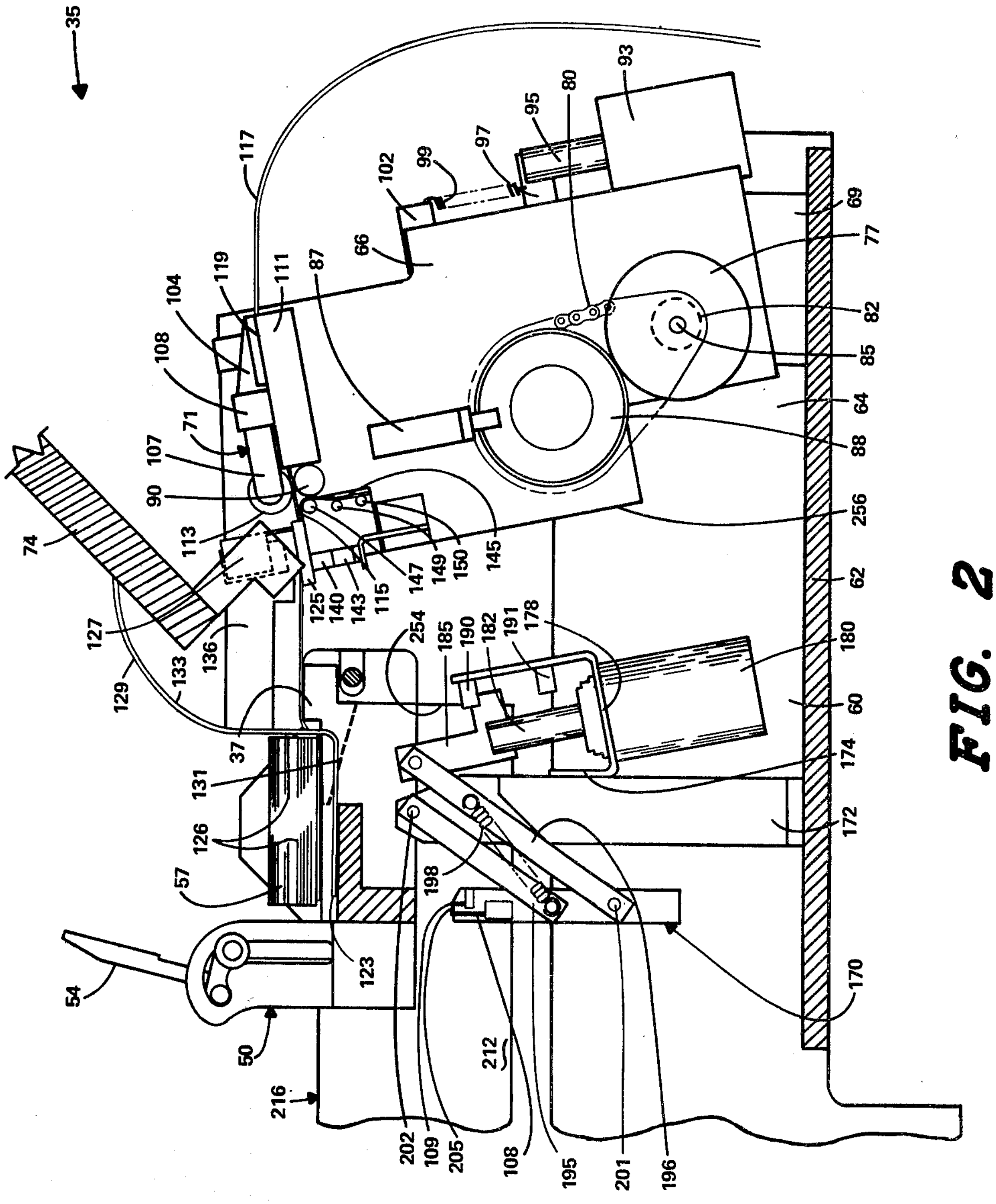
FIG. 2 is a cross-section taken along line 2—2 of FIG. 1.

FIG. 2 shows a cross section along line 2—2 of FIG. 1. The platen 37 and clamp 50 are shown at what is referred to hereinafter as its first or receiving position relative to a fixed frame 60. The frame 60 is composed of some rigid material such as metal and supports the remainder of the structure. The frame 60 includes a base plate 62 which extends horizontally beneath the platen and clamp and the other components of the strapping apparatus 35. Walls (only one wall 64 is shown in FIG. 2, its other opposite wall is not shown) extend upward from the base plate 62 and are disposed generally parallel to the direction of movement of the platen (to be discussed in detail hereinafter). An encasement 66 is attached to a pedestal 69 which in turn is attached to the baseplate 62. Pedestal 69 provides a general support for various components of the system and in particular for the encasement structure which is generally disposed upward from pedestal 69 and within which are mounted many of the system components including the feeder mechanism 71. Of course, various other means may be used to support the components and their arrangement may vary as desired due to various space limitations within the particular adaptation of the invention disclosed herein. For example, the encasement structure 66 could be suspended from the portion of the frame 60 which extends above the feeder mechanism 71 and is attached to the remainder of the frame through various beams and rigid structural plates (not shown).

Plate 74 which is located above the feeder mechanism 71 is such a support from which the encasement 66 could be suspended. Various types of skeletal frames could be utilized to position the components in their proper locations. A motor 77 is selectively actuated and drives a linked chain 80 which is engaged about a pinion 82 which is affixed to the shaft 85 of motor 77. Motor 77 may be any type of motor but must be a bidirectional motor in that it is necessary that the motor be repeatedly slowed and stopped and the direction of its motion reversed. Chain 80 extends from the pinion 82 about a tooth gear 88 for the purpose of driving the gear 88 and through various pulleys and gears or other types of linkages (not shown) to drive a roller 90. Roller 90, motor 77, and its associated gears and drive mechanism are a portion of the feeder mechanism 71. Roller 90 is therefore linked to shaft 85 such that as shaft 85 rotates in a particular direction, roller 90 rotates in one direction and when shaft 85 reverses rotation to the other opposite direction, roller 90 also reverses its direction of rotation.

Located adjacent to motor 77 on encasement 66 is solenoid 93. Solenoid 93 is provided with a shaft 95 which moves in response to electrical current applied to the solenoid. In other words, solenoid 93 is a typical solenoid device. Shaft 95 is connected at its end away from solenoid 93 to an arm 97. A spring 99 has one end attached to arm 97 and its other opposite end is attached to an extension 102. Solenoid 93, shaft 95, arm 97, spring 99, extension 102, and other various parts form a linkage which is connected to one end 104 of rocker 106. Rocker 106 is pivotally connected to block 107 which is in turn connected to a guide 111 (to be discussed in detail hereinafter). Guide 111 is attached to encasement 66. When solenoid 93 is actuated, the end 113 of rocker 106, which is opposite to end 104, is urged downward toward roller 90.

A strap 115 is disposed between roller 90 and roller 113, and passes over roller 90 and under roller 113. A portion 117 of strap 115 extends from guide 111 to a supply of the strap (not shown) through guide 111. Guide 111 acts to ensure that strap 115 maintains the proper lateral position between rollers 90 and 113 by means of a slot (not shown) disposed along the upper edge 119 of guide having a width approximately equal to or slightly greater than the width of the strap 115. The strap extends from the supply (not shown) through guide 111 between the rollers 90 and 113 through movable guide 125 across to platen 37 and beneath the object 57 to an end 123 of the strap 115. Movable guide 125 has elements which pass over the strap to prevent the strap from disengaging the guide. A sensor 127 is located above the guide 125 to detect the end 123 of strap 115 in the guide.

The object 57 can be stacked sheets 126 of paper, documents, or other material, for example, currency. The object 57 is received by platen 37 from a catcher 129. Catcher 129 has a forked lower portion 131 and an upper curved portion 133. The catcher is attached to a support 136 which is pivotally connected (attachment not shown herein) to plate 74. The end 133 (FIG. 4) of catcher 129 adjacent its upper curved portion 133 is movable into and through a slot (not shown) in plate 74 of frame 62. The catcher is biased upward to the position shown in FIG. 3 by a spring (not shown). It is movable downward by some motivative means such as a motor or solenoid (not shown) to the position shown in FIG. 2. The catch may be of any suitable design and be located at any proper location from which it is possible to load the object.

The movable guide 125 has a downward extending nib 140 which is movable into and out of a slot (not shown) in sensor 143. When the nib 140 extends into the slot in sensor 143, sensor 143 so indicates. The movable guide 125 is attached to a flexible but resilient strip 145. Strip 145 extends from guide 125 and extends about pin 147. Other pins (only two of which are shown, 149 and 150) hold the strip 140 in place. Thus strip 145 extends from guide 125 about pin 147 where it is in contact with encasement 66 along its side away from the side in contact with pin 147. The strip then extends downward and is curved to maintain contact with pins 149 and 150. When the strap 115 has tension applied to it, guide 125 moves downward because of the flexible but resilient material of which strip 145 is composed. Thus strip 145 acts as a spring which urges guide 125 to approximately the position shown in FIG. 2 but allows the guide 125 to move downward when tension is applied to the strap for indicating via sensor 143 that the strap is indeed under tension. Sensor 143 can be any well known sensor type but an infrared sensor on one side of the slot with an infrared source on the other is particularly useful.

Figure 4:
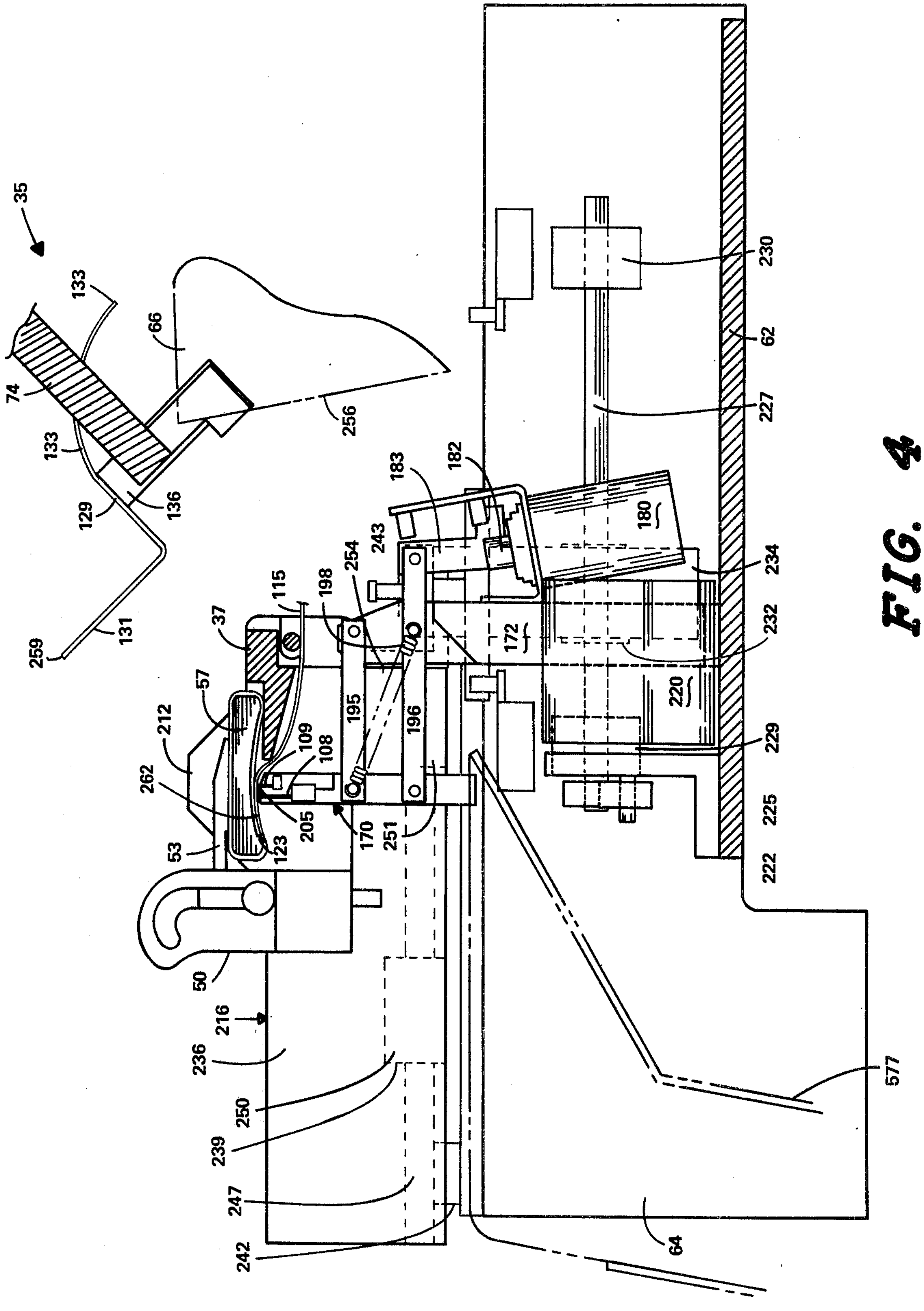
FIG. 4 is a cross-sectional view taken along line 4—4 of FIG. 3.

A movable severing and sealing tool 170 is also shown in FIG. 2. A spar 172 extends upward from the base plate 62 of frame 60. A bracket 174 is attached to the upwardly extending spar 172 at approximately its midpoint. The bracket extends away from spar 172 and has a U-shape with one upward leg of the U attached to the spar 172. The bottom of the U 178 has a hole therein into which is affixed a solenoid 180. Solenoid 180 is the typical type of solenoid which is actuated to move a shaft 182 into and out of the solenoid. The end of the shaft 182 extending away from the solenoid 180 is pivotally connected to an L-shaped member 185. The long leg of the L extends in a direction approximately the same as the longitudinal extension of the shaft 182. The shorter leg of the L-shaped member 185 extends perpendicular to the direction of movement of the shaft 182 and away from the spar 172. A portion of a leg of the U-shaped bracket extended upward from the bottom 178 is located adjacent to the portion of the L-shaped member extending away from shaft 182. Two sensors 190 and 191 which can be of the same type as sensor 143, are positioned on the bracket so as to have the L-shaped member 185 pass into slots (not shown) contained within the sensor when the shaft 182 is at its extreme positions both upward and downward, sensor 190 senses the extreme upward position and sensor 191 senses the extreme downward position. The extreme upward position is shown in FIG. 2 and the extreme downward position is shown in FIG. 4.

Tool 170 is attached by parallel arms 195 and 196 to spar 172 and L-shaped member 185. One end of arm 195 is pivotally attached to tool 170 at just above midpoint. The other opposite end of arm 195 is pivotally attached to spar 172 adjacent its top. Arm 196 is pivotally attached to tool 170 adjacent its lower end and to L-shaped member 185 at its top. The arm 196 is also pivotally attached to spar 172 intermediate its connections to L-shaped member 185 and tool 170. Intermediate these pivotal connections arm 196 is pivotally connected to spar 172 below the attachment of arm 195. A spring 198 is attached between the pivotal attachment of arm 196 to spar 172 and the pivotal attachment of arm 195 to tool 170. Bolts 201 and 202 or other types of fasteners are provided to attach arm 196 to tool 170 and arm 195 to spar 172. Spring 198 provides tension between the end of arm 196 attached to the spar and the end of arm 195 attached to the tool. The tool 170 is provided with a flat head 205 which is disposed at the upper end tool 170 and forms a flat plane which is approximately horizontal. Electrically resistive wires 108 and 109 are attached to tool 170 along its sides and extend over the head of tool 170 to the other side of the tool. The wires act as heating elements. Tool 170 and the function of wires 108 and 109 will be discussed in detail hereinafter.

Platen 37 and clamp 50 are attached between plates 212 and 213 (FIG. 1) which along with other parts to be discussed hereinafter comprise the carriage frame 216. The carriage frame 216 is slideably attached to frame 60 so as to allow the platen 37 and the clamp 50 to be moved from its relative position rearward close to catcher 129 (FIG. 2) forward to its position away from catcher 129. The structure of the platen will be discussed in detail by comparison of FIGS. 1, 2, and 4 herebelow. However, prior to proceeding with that discussion, the motors and associated linkages with the movement of carriage frame 216 (as shown in FIG. 4) are discussed herebelow.

A motor 220 is attached via a belt 222 around a gear (not shown) and to another gear (not shown) to a shaft 227 for the purpose of rotating the shaft 227 in response to the relative rotation of motor 220. Motor 220 is a reversable type motor which allows the direction of rotation of shaft 227 to be either clockwise or counterclockwise. Shaft 227 is suspended above base plate 62 by supports 229 and 230 which have holes (not shown) therein through which and into which shaft 227 is passed. The holes are of a slightly larger diameter than the diameter of shaft 227 so as to allow shaft 227 to rotate freely therein but without allowing shaft 227 to vibrate significantly. Thus, supports 229 and 230 form bearings with shaft 227.

A linear actuator drive mechanism 232 is also disposed about shaft 227. The actuator is a device which transforms the rotational motion of shaft 227 into linear motion for the purpose of driving carriage frame 216. A bar 234 is attached to drive mechanism 232 adjacent one end and at its other opposite upper end to outer plate 236 of carriage frame 214. The axis of rotation of platen 37 provided by shafts 40 and 46 is perpendicular to the line of movement of the carriage frame 216.

Figure 3:
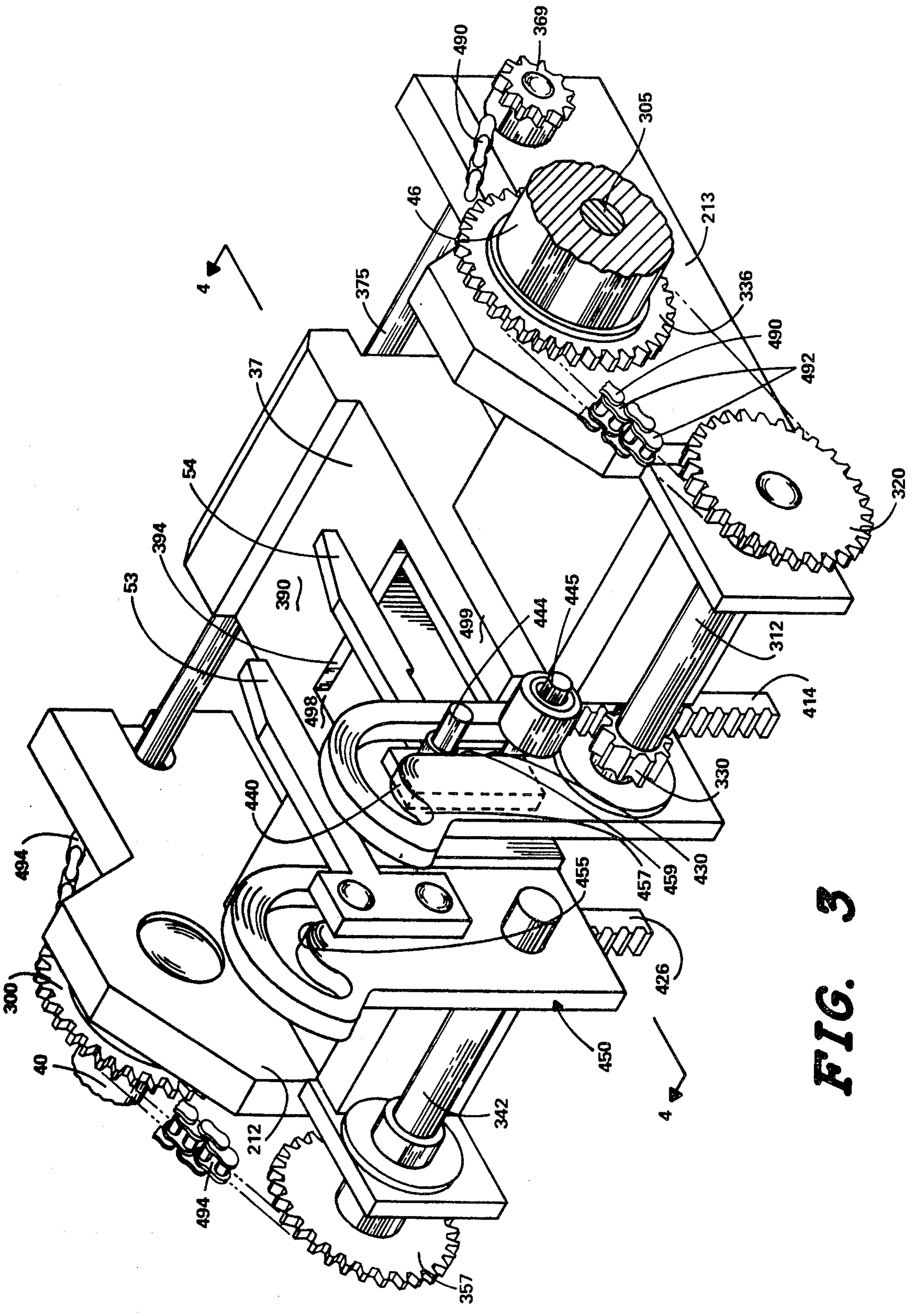
FIG. 3 is a view in perspective of a strapping apparatus with the clamp of FIG. 1 shown in its engaged position.

Plate 236 is slideably attached to wall 64 of frame 60 along the upper edge of the wall by a slideable attachment 239 which is comprised of supports 242 and 243 which are affixed to wall 64 and have a rod 247 attached between the supports such that the rod 247 has its longitudinal axis approximately horizontal. Blocks 250 and 251 are attached to plate 236 and have holes therein to receive rod 247. In other words, a bearing is formed between blocks 250 and 251, and rod 247 such that the plate 236 can be moved relative to the wall 64 by the slideable movement of blocks 250 and 251 over rod 247. Thus, when the drive mechanism 232 moves linearly relative to the shaft 227, carriage 212 and, in particular as shown above, plate 236 moves relative to wall 64. The extreme positions of the movement of the carriage frame 212 can best be seen by a comparison of FIGS. 2 and 4. The purpose of removing the platen 37 from adjacent of catcher 129 is to allow the catcher to be used to receive another object during the wrapping of the strap about the object. In order words, the catch is available for a longer period of time. In FIG. 2, the end 254 of plate 236, which is adjacent to the rearward part of the strapping apparatus 35, is shown in its extreme rearward position which is the closest position it has to encasement 66 along the forward wall 256 thereof. In FIG. 3, most of the components associated with the encasement 66 have been omitted but as can easily be seen, the rearward end 254 of plate 236 is much further from the wall 256. Figure 4 shows the extreme forward position of the carriage frame 212. The drive mechanism for the carriage frame has been omitted in FIG. 2 for the purpose of clarity just as most of the mechanisms associated with encasement 66 have been omitted in FIG. 4.

It should be noted further that comparison of FIGS. 2 and 4 shows the up or receiving position of catcher 129 (FIG. 4) and the unloading or down position of the catcher 129 (FIG. 2). In the up or receiving position shown in FIG. 4, an object is moved by a mechanism (not shown) on the document processing system (not shown) down plate 74 onto the curved upper portion 133 of the catcher 129 and down along the surface of the catcher until it reaches the lower forked portion 131 of the catcher and is stopped thereby. When the platen has been moved by the carriage frame 216 to its receiving position (FIG. 2), the catcher then moves downward to the position shown in FIG. 2 and deposits the object 57 onto the platen 37. After the object is loaded onto the platen and carriage frame 212 has moved forward into the position shown in FIG. 4, it is then possible for the catcher to move upward again because the object 57 has moved beyond the end 259 (FIG. 4) of the catcher 129 which allows the catcher to move to the position in FIG. 4 without obstruction.

Clamp 50 is shown in FIG. 4 in its clamped or engaged position. FIG. 2 is the unclamped or disengaged position. The function of the clamp 50 and the fingers 53 and 54 thereof will be discussed in detail hereinafter but it should be noted at this point that the pressure exerted by the clamp 50 holds the object 57 engaged with the platen.

Tool 170 is shown in FIG. 2 in its down position and in FIG. 4 in its up (or severing or sealing) position. Spar 172 is affixed to the base plate 62 and has of course not moved. However, the solenoid 180 has been actuated to retract or pull the shaft 182 (FIG. 4) into the solenoid and thereby move L-shaped member 185 downward and the parallel arms 195 and 196 to an almost horizontal position, and tool 170 upward so that tool head 205 is engaged with strap 115 which is wound about object 57. The winding of the strap 115 about the object 57 is discussed in detail hereinafter. Spring 198 as shown in FIG. 4 is slightly extended from the position in FIG. 2. The function of spring 198 is to aid in the downward movement of tool 170 and to some extent to maintain the downward position of 170. Strap 115 has been wrapped about object 57 from the end 123 through an overlapping portion 262 and onto the guides, etc., of encasement 66 shown in FIG. 2. Tool 170 has its tool head 205 engaged with the strap at the overlapping portion 262, and more particularly, the electric resistive wires 108 and 109 are engaged with the overlapping portion 262 of the strap 115. The function of tool 170 in this position will be discussed in detail hereinafter.

As shown in FIG. 1, the clamp 50 and the platen 37 are disposed between plates 212 and 213. The clamp as shown in FIG. 1 is in its open or disengaged position of the drive mechanism for closing and opening the clamp and for rotating the platen as will be discussed herebelow. Outer plate 236 (FIG. 4) is connected via drive shaft 40 for rotating the platen. A hole 292 in plate 212 has end 294 affixed therein. The other end 296 (FIG. 7) of shaft 290 is affixed into a hole in a gear 298 located on the side of outer plate 236 away from plate 212. A gear 300 (FIG. 1) is rotatably connected about shaft 40 between plates 212 and 236. When shaft 40 is rotated about its axis of rotation, plate 212 is also rotated and as will be explained herebelow, platen 37 and clamp 50 are also rotated. The rotation of shaft 40 has no effect on the rotation of gear 300 because of the rotatable connection therebetween.

Figure 6:
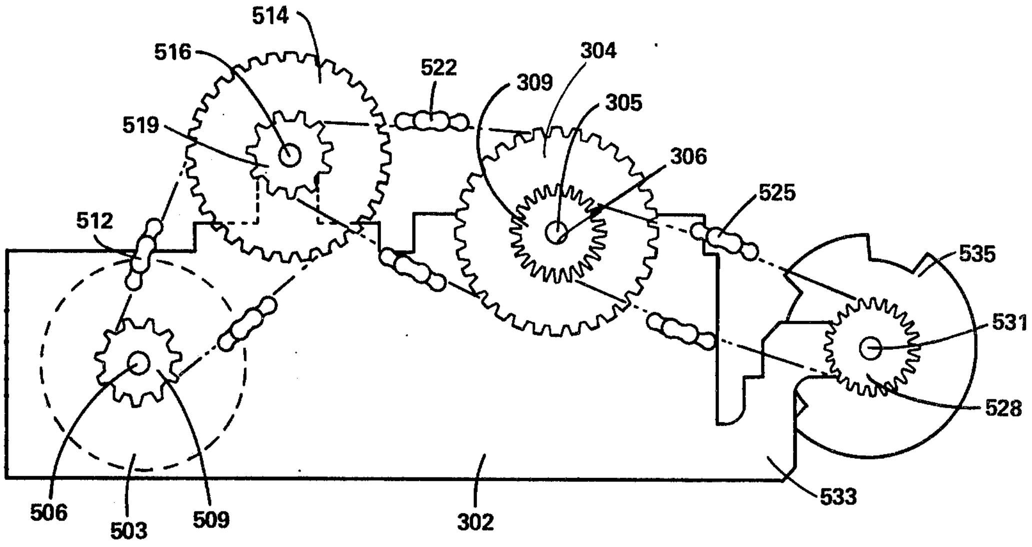
FIG. 6 is a side view of the drive mechanism for the clamp shown herein.
Figure 7:
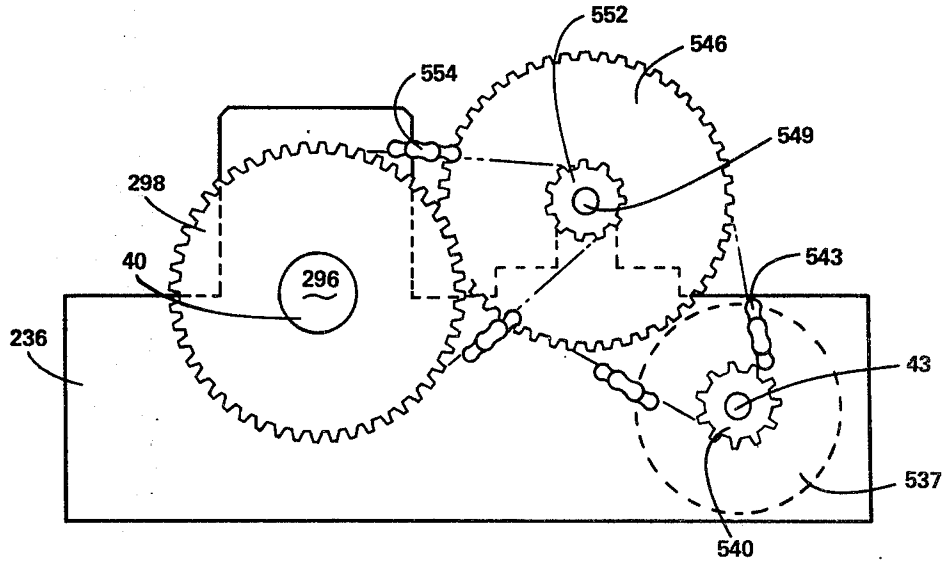
FIG. 7 is a side view of the drive mechanism for rotating the platen of FIG. 1.

Shaft 46 is rotatably connected into a hole (not shown) in plate 213 such that shaft 46 is freely rotatable therein. Located along the shaft 46 away from plate 312 is another outer plate 302 (FIG. 6) which is similar to plate 236 (FIG. 7). Shaft 46 (FIG. 3) is affixed into a hole (not shown) in a gear 304. A shaft 305 is fit into a hole 306 in a small gear 309. The attachment of shaft 46 to gears 304 is such that as the shaft 46 rotates so does the gear 304. Shaft 305 passes through shaft 46 (FIG. 3) and is affixed to plate 213. A hole is provided in plate 302 so that shaft 46 can rotate freely therein and also be supported by plate 302. A drive shaft 312 passes through a hole 314 in plate 213 and is freely rotated therein. One end 316 of drive shaft 312 is affixed into a hole 318 in a gear 320. It should be understood as described herein any gears affixed to a shaft unless indicated otherwise are affixed so that the axis of rotation of the shaft is coincident with the center of the gear and perpendicular to the plane formed by a circumference of the gear.

The other end (not shown) of shaft 312 passes through a hole in a disk 324. Disk 324 is affixed to shaft 312 and rests against sheet 327 to form a bearing therewith to prevent shaft 312 from moving parallel to its longitudinal axis of rotation. A similar disk (not shown) can be affixed to shaft 312 to rest against plate 213. A pinion 330 is affixed to shaft 312 adjacent but spaced from disk 324 through a hole 332 in pinion 330.

Sheets 212 and 213 are similar and a detailed discussion of one can suffice for both. Sheet 213 has a basically rectangular shape which extends from a rearward end 334 to a forward end 336. Except for the portion of sheet 312 which is adjacent to end 336, sheet 213 has a uniform depth with the portion of the plate adjacent to end 336 being of a slightly smaller width. Also plate 213 has an upwardly extending ear 339 which is positioned to provide structural support around the hole provided for shaft 46.

A drive shaft 342 passes through a hole (not shown) in plate 212 and has a disk 344 similar to disk 324 positioned adjacent to plate 212 for preventing longitudinal movement of shaft 342. Disk 344 has a cylindrical portion 347 which extends along shaft 342 away from sheet 212. Shift 342 extends through holes in cylindrical portion 3 and 7 and disk 344 and is affixed therein. The surface of disk 344 adjacent plate 212 forms a bearing therewith. A disk (not shown) similar to disk 324 is affixed to shaft 342 adjacent to sheet 350. Shaft 324 passes through a hole 352 in sheet 350 and terminates in an end 354.

A gear 357 is affixed to the end (not shown) of shaft 342 away from end 354. Gear 357 has a cylindrical portion 359 which extends along shaft 342 and abrupts the plate 212. Gear 320 has a similar cylindrical portion (only a very little bit which is shown and designated as 362. Shaft 46 has a gear 366 affixed adjacent but spaced from plate 213. As stated above, shaft 46 is rotatably attached to the plate 213. A pinion 369 having a cylindrical portion 371, which extends to abrupt plate 213 forming a bearing is affixed adjacent to an end of a drive shaft 375 by passing an end 373 of the drive shaft through a hole 377 in pinion 369. Shaft 375 passes through a hole in plate 213 and extends through a hole (not shown) in plate 212. The shaft is freely rotatable within the holes in plates 212 and 213. As can be seen on plate 212, a countersunk notch 380 is provided prior to passing shaft 375 through the hole in plate 212. Another pinion (not shown) similar to pinion 369 is affixed to an end (not shown) of shaft 375 in a manner similr to the affixation of pinion 369 to end 373.

Prior to a detailed discussion of the clamp 50, platen 37 is now discussed in detail. Platen 37 has horizontally extending plates 384 and 385 extending from an affixed to plates 212 and 213, respectively. Plates 384 and 385 extend horizontally from plates 212 and 213 into the area between the two plates 212 and 213 and are affixed to a U-shaped structure 390. Structure 390 has a horizontal upper side or surface 392 in which notch 394 is disposed. Surface 392 is the portion of the U-shaped structure between the two legs thereof. The downwardly extending legs 396 and 397 of structure 390 have plates 284 and 285, respectively, are affixed hereto. The notch 394 has an open mouth 399 and also has a basic U-shape. The notch 394 is in a side of structure 390 parallel to the axis of the shafts 40 and 46, and, as shown in FIG. 1, is located in the forward side. Surface 392 has a nib 402 which extends upward from surface 390 and has a vertical face 404 which acts as a back stop for object 57. Sheets 126 are stacked parallel to surface 392. Nib 402 extends slightly more rearward than the rearward end of the legs 396 and 397. This arrangement of the various rearward extensions of nib 402 and the legs 396 and 397 is to permit shaft 375 to pass unobstructed between plates 212 and 213 and to freely rotate.

The motivating force applied to shaft 46 opens and closes (or engages and disengages) the clamp 50. The clamp 50 will be discussed in detail herebelow. Plates 408 and 409 extend from plates 212 and 213 to sheets 350 and 327, respectively, and are affixed thereto. Plates 408 and 409 are also affixed to plates 384 and 385, respectively. The plates 408 and 409 abut legs 396 and 397, respectively, at their ends and can be affixed thereto if desired. Plates 408 and 409 extend in a basically vertical orientation and are of the same depth except at the ends of the plates adjacent the sheets. Adjacent the sheets 327 and 350, vertical notches (only notch 412 associated with plate 409 is shown) are provided in the plates. A rack 414 is shown abrupting the edges of notch 412. The teeth 416 of rack 414 are shown engaged with the teeth 418 of pinion 330 in the standard rack and pinion arrangement. As pinion 330 is rotated by shaft 312, the rotational movement of the pinion is translated into the linear movement of rack 414. The upper end (not shown) of rack 414 is joined to a cylinder 421. Cylinder 421 has an inner hole 423 disposed therein.

Another rack 426 (FIG. 3) is associated with another pinion (not shown) similar to pinion 330 which is affixed to the notch (not shown) of plate 408. The parts associated with rack 426 are similarly located and interconnected as the parts associated with rack 414 are located and interconnected. As drive shaft 342 is rotated, the rotational motion is translated into the linear motion of rack 426. Referring back to FIG. 1, a cut-out or slot 430 (or opening) is provided in sheet 327. The slot 430 has two parts, an arcuate cut-out 433 and a straight segment 335. The arcuate cut-out 433 is disposed at the upper portion of sheet 327 and extends in an arc which begins at one end, as the cut-out changes from the straight segment 335 to the arcuate cut-out 433 and terminates at the other end in the end 338 of slot 430. The end 438 is somewhat lower than the highest point 440 of the lower edge of the arcuate cut-out 433.

Pins 444 and 445 have one end (not shown) affixed into holes (not shown) in finger 54. The other opposite ends 448 and 449 of pins 444 and 445, respectively, extend through slot 430 for the purpose of forming a cam action between the finger 54 and the sheet 327. A cylinder 452 is provided to form a bearing with pin 444. Pin 444 passes through a hole in cylinder 452 and is freely rotatable therein. The end 449 of pin 445 passes through the hole 423 in cylinder 421, which is adjoined to rack 414 to provide motivating force to finger 54.

Sheet 350 is provided with a slot 455 which is similar to slot 430 and has an arcuate cut-out 457 and a straight segment 459. Pins 462 and 463 are affixed into holes 465 and 466, respectively, in finger 53. The ends of pins 462 and 463 opposite to ends 462 and 463, respectively, extend through slot 455, and pin 463 extends through a cylinder (not shown) which is similar to cylinder 421 associated with pin 445. This cylinder is attached to rack 426 and performs the same function between pin 463 and rack 426 as cylinder 421 performs between rack 414 and pin 445. Pin 462 has a cylinder (not shown) which is similar to and performs the same function as cylinder 452 which is associated with pin 444. All of the pins 445, 462, and 463 can be provided with cylinders similar to cylinder 452. The fingers 53 and 54 are held against sheets 327 and 350 by some standard method, for example, by maintaining the cylinders in a fixed longitudinal relationship with their respective pins and having the cylinder provided with an outward extending rib, which extends beyond the width of the slot and is located away from the fingers a distance slightly greater than the thickness of the sheets.

Figure 5:
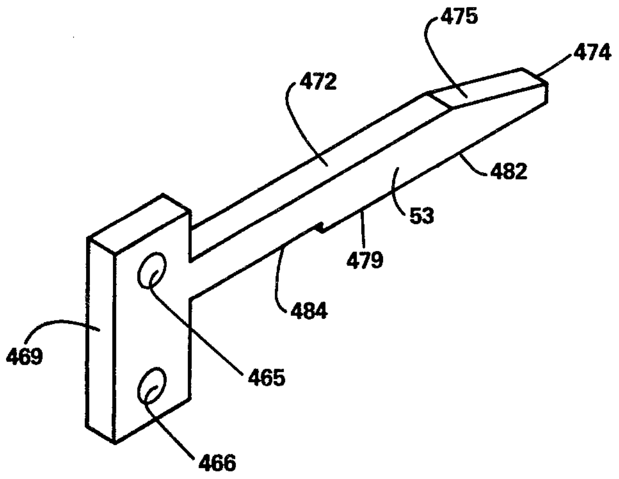
FIG. 5 is a detailed and enlarged view in perspective of a finger utilized in a clamp used with the present invention.

Fingers 53 and 54 are similar and a detailed discussion of one can suffice for both. As shown in FIG. 5, finger 53 has holes 465 and 466 in a basically rectangular base 469 thereof. A digit 472 extends from one of the longer sides of the rectangular base 469 and is basically perpendicular to that side. The digit terminates in an end 474 of a tapered portion 475 which is away from the base 469. Although the lower surface 479 of digit 472 is of a particular shape as shown herein adapted for documents or currency, which are engaged by the fingers 53 and 54 along the flat surface thereof, the lower surface 479 of digit 472 can be of any general shape which is adapted to hold the object 57 (FIG. 3) in place. In order to be adapted for a flat surface, the lower surface 479 is flat along the portion 482 which actually contacts the object 57 between the end 474 and a nitch 484. Nitch 484 extends from the contacting portion 482 to the base 469.

FIG. 1 as discussed above shows the clamp 50 with its fingers 53 and 54 in the open or disengaged position. In FIG. 3 the fingers 53 and 54 are shown in the engaged or closed position. A link chain 490 extends about gear 320 upward over the top of gear 336 and around pinion 369 and onto gear 320 and there about. The links 492 (FIG. 3) of chain 490 are adapted to fit the teeth of the gears 320 and 336, and pinion 369. Thus, as shaft 46 is rotated, thereby rotating gear 336, chain 490 moves and rotates gear 320 and pinion 369. As discussed above, when pinion 369 rotates, shaft 375 also rotates and another pinion (not shown) at an end of shaft 375 adjacent to plate 212 is rotated.

A link chain 494 (FIG. 3) is disposed about the pinion located at the end of shaft 375 and gears 300 and 357 in much the same manner as the disposition of chain 490 about gears 320 and 336, and pinion 369. Thus, as shaft 375 rotates, chain 494 transmits the rotary motion of shaft 475 to gears 300 and 357 causing them to rotate. As can be seen from this type of linkage, both pinions (only pinion 369 is shown) and the gears 320, 300, 336 and 375 rotate in the same direction. Because gears 320 and 357 are rotating, shafts 312 and 342 also rotate. This in turn causes pinion 330 to rotate and another pinion associated with shaft 342 (not shown) to rotate also which causes racks 414 and 426 to move linearly (vertically).

If shaft 46 is driven in a clockwise (as shown in FIG. 3) direction, the racks are moved downward and when shaft 46 is moved in a counterclockwise direction, racks 414 and 426 move in an upward direction. As shown in FIG. 1, when pin 444 is adjacent the end of the arcuate cut-out 438, it must travel upward over point 440 prior to entering the straight segment 435. Thus, the fingers 53 and 54, when in the up position, are removed from the area over the platen 37 so that the object may be received thereby. As racks 414 and 426 are moved downward the fingers move over and above the platen and then are moved downward until they are in contact with the object 57. The contacting surface 479 (FIG. 5) is parallel to surface 390 when the pins 462 and 466 (FIG. 1) are in the straight segment 459 of the slot 455.

This can be best seen in FIG. 3. The fingers 53 and 54 are disposed over ledges 498 and 499, which are the portions of the upper surfaces 390 of platen 37, located along the sides of the notch 394. As noted above, after the catcher 129 has lowered object 57 down onto the platen 37 (as shown in FIG. 2), the clamp is engaged (as shown in FIG. 4) with the object between the fingers and the platens and, more particularly, between the fingers 53 and 54 and the ridges 498 and 499, respectively. The force exerted by fingers 53 and 54 must be great enough to compress and securely hold the object 57 as shown in FIG. 4.

The force which is applied to the object for holding it against the platen is supplied by a motor 503 (FIG. 6) which rotates a shaft 506 to which a pinion 509 is attached. A link chain 512 is connected about pinion 509 and a gear 514. Gear 514 is affixed to a shaft 516 which is rotatably connected to outer plate 302. Plate 302 is the counter part to plate 236 and is a part of the carriage frame 216. A pinion 519 is also affixed to shaft 516 and is rotatable therewith. A link chain 522 passes around pinion 519, and toward and around gear 304. Another chain 525 passes around gear 309 and around another similar gear 528. Gear 528 is affixed to a shaft 531 which is rotatable within a hole in an extension 533 of outer plate 302. A code wheel 535 is affixed to shaft 531. Sensor devices (not shown) associated with code wheel 535 provide information on the location of the platen because shaft 306 rotates within platen. Thus, motor 503 provides motivating power through shaft 46 (and the gears and chains associated therebetween) to clamp 50 for the purpose of motivating fingers 53 and 54.

Outer plate 236 (FIG. 7) has a motor 537 attached thereto. Motor 537 turns a drive shaft 43 which in turn causes pinion 540, which is affixed to shaft 43, to rotate. A link chain 543 passes around pinion 540, and extends toward and passes about gear 546. Gear 546 is attached to a shaft 549. Shaft 549 is mounted on outer plate 236 in such a manner as to be freely rotatable with respect to the plate. A pinion 552 is attached to shaft 549 and has a link chain 554 extending thereabout. Chain 554 extends from pinion 552 and about gear 298, which is affixed to shaft 40. Thus, motor 537 provides power to shaft 40 through the other pinions change in gears associated therebetween as shown in FIG. 7 for rotating the platen 37 and clamp 50.

A constant pressure (or fairly constant pressure) is maintained by clamp 50 while engaged with the object 57 as the platen is rotated because motor 503 continuously applies torque to shaft 506. Motors 503 and 537 are adapted to turn their respective shafts 506 and 43 in either a clockwise or counter clockwise direction, as desired. The fingers move over the platen and downward to contact the object with their contacting surfaces parallel to the surface of the object. The downward action als allows different thicknesses of objects to be accomodated, for example, different thicknesses of documents which comprise the object.

Figure 12:
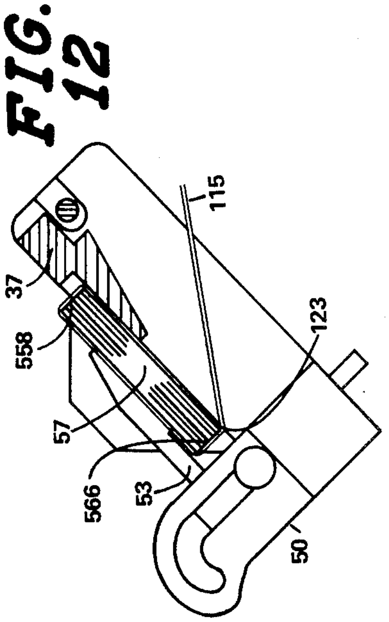
FIGS. 8-12 show the clamp and platen at various positions as the platen is rotated to wrap the strap about an object.
Figure 8:
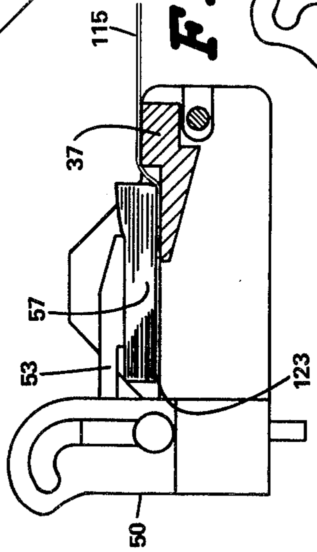
Figure 9:
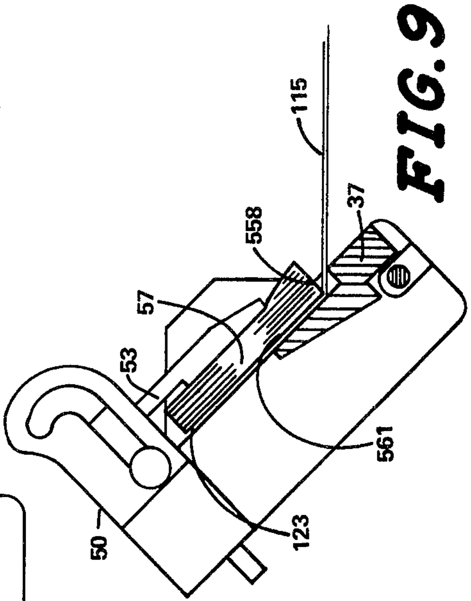
Figure 11:
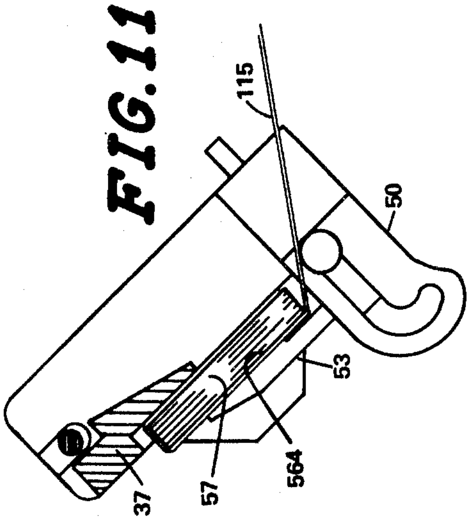
Figure 10:
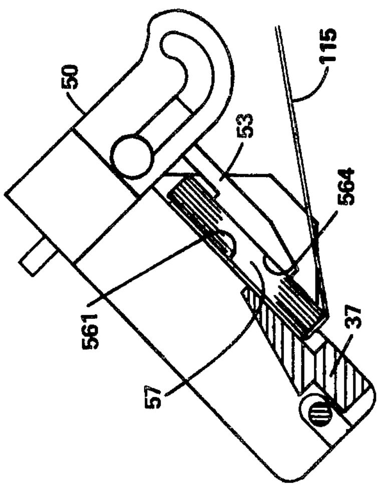

FIGS. 8 through 12 show the object 57 being wrapped by the strap 115. In FIG. 8, the clamp 50 has finger 53 engaged with the object 57. Strap 115 has end 123 under the object within the notch 394 (FIG. 1). Motor 537 (FIG. 7) is actuated and the platen 37 and clamp 50 are rotated thereby. FIG. 9 shows the clamp 50 and platen 37 after rotating approximately 45 degrees. The strap 115 is now engaged with an end 558 of object 57. The portion of strap 115 adjacent end 123 is engaged with the side 561 of object 57. In FIG. 10, the rotation has continued approximately 90 degrees from FIG. 9 for the strap 115 is now prepared to lay over side 564 of object 57 (which is opposite from side 561). In FIG. 11, the platen and clamp have continued to rotate and the strap is now engaged with side 564. In FIG. 12 the strap 115 has wrapped over the end 566 of object 57 opposite from end 558. The platen and clamp have rotated approximately 315 degrees from the position in FIG. 8 to the position in FIG. 12. Further, strap 115 is beginning to cover end 123 and to wrap over the portion of strap 115 adjacent to end 123. A stop (not shown) located on plate 236 prevents the platen from rotating more than 360 degrees. Thus, the platen is rotated in one complete turn.

The platen and clamp are stopped at the position shown in FIG. 4. Thus, the strap has been wrapped about the object 57 by rotating the object platen and clamp 360 degrees in a first rotary direction which is clockwise (as shown in FIG. 4). The first rotary direction is away from end 123 of strap 115. Tension is applied to strap 115 by roller 90 (FIG. 2) which is rotating in a clockwise direction with solenoid 93 actuated to force solenoid 113 downward to engage the strap 115 between the rollers 90 and 113 to provide a tight wrap.

It should be noted that in order to rotate the clamp and platen one complete turn it is necessary that the parts be arranged so that there is no enganglement of parts except for the stop (not shown) which prevents rotation beyond 360 degrees. It is also necessary that the portion of the object which is to be wrapped by the strap not be overlaid by other parts so that the strap contacts the object. The fingers 53 and 54 must be a certain distance apart which is greater than the width of the notch 394. The strap must be of a width less than the width of the notch.

As shown in FIG. 4, the severing and sealing tool 170 is then engaged with the overlapped portion 162 of strap 115 which is adjacent to end 123 along its head 205 of tool 170. After the strap is cut and sealed, the platen and clamp are derotated and the clamp is disengaged from object 57. This operation is shown in FIGS. 13 through 18. The operation of severing and sealing tool 170 will be discussed in detail hereinafter.

Figure 13:
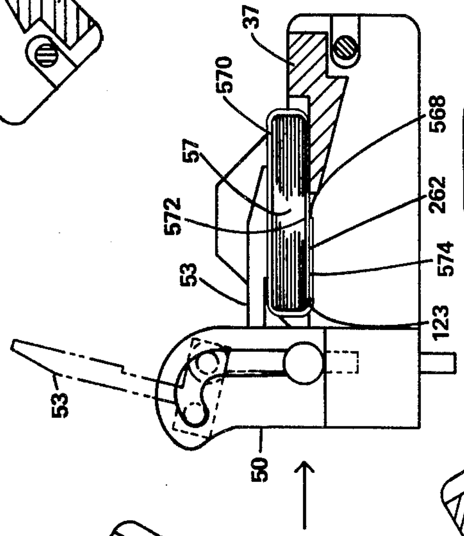
Figure 15:
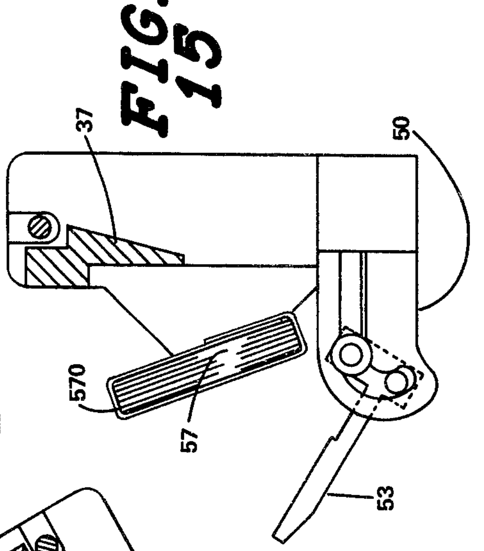

After the strap 115 is cut and pulled away from the newly formed end 568 of wrapper 570 which is a continuous strap, wrapper 570 is the portion of strap 115 which remains about object 57 after the severing and sealing operation is complete. As seen in FIG. 13, the seal exists somewhere within the overlap portion 262. The overlap portion has an inner layer 572 which is located adjacent to the object 57 and an outer layer 574. The seal exists somewhere along the overlap portion 262 and is the segment of strap in contact with wire 108 FIG. 20. Finger 53 is shown engaged with the object 57 and is also shown by the dotted lines at its disengaged position. As the platen and clamp derotate 45 degress as in FIG. 14, the clamp 50 begins to disengage and finger 53 moves upward. Of course, the finger 54 (not shown in FIGS. 13 through 18) moves synchronously with finger 53. As the platen and clamp continue to rotate, the clamp 50 continues to move its fingers toward the open position (as shown by the dotted lines in FIG. 13) and the object 57 with wrapper 570 thereabout disengages from the platen and begins to fall away from the platen, as seen in FIG. 15.

Figure 17:
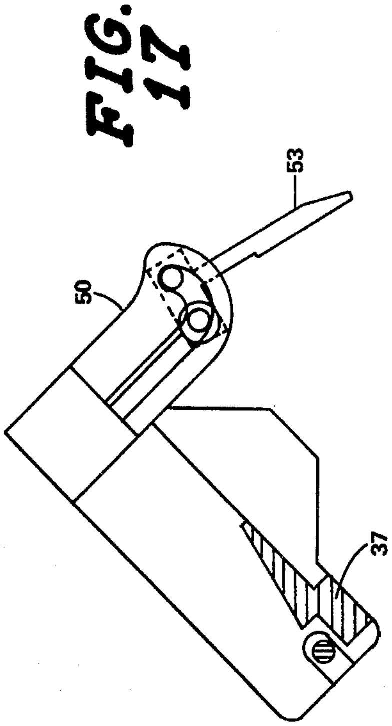
FIGS. 13-18 show the clamp and platen as de-rotation occurs with the clamp releasing the object.
Figure 16:
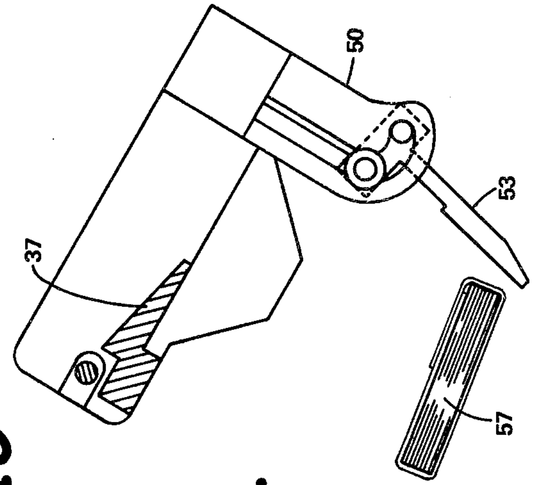
Figure 18:
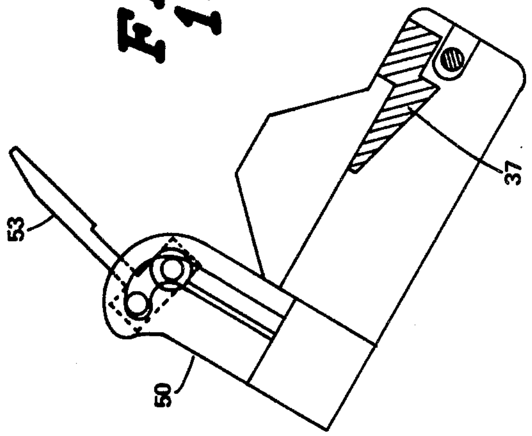
Figure 14:
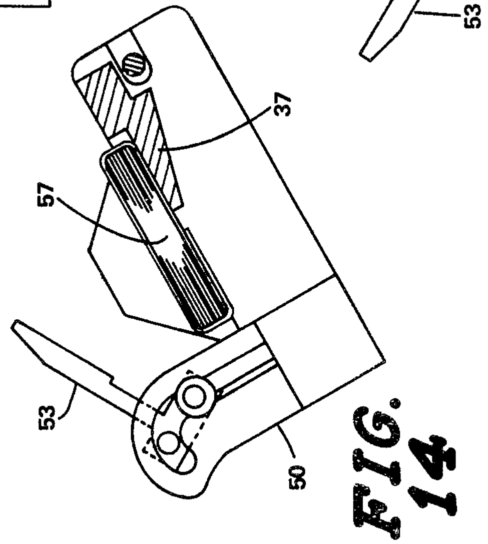

FIG. 16 shows the platen and clamp having rotated through approximately 135 degrees and the object 57 falling away from there toward a bin 577 (FIG. 4) which is positioned to receive the object 57 during this derotation of the platen and clamp. The finger 53 is now in its open position and as shown in FIGS. 17 and 18, remains in this open position as the platen and clamp continue to derotate until the platen and clamp have rotated through 360 degrees or one complete turn to the relative position shown in FIG. 13 with the fingers in the disengaged position (as shown by the dotted lines representing finger 53) without the object 57. After this operation is complete, the platen is then ready to receive another object and is moved rearward to the forward position shown in FIG. 2 from the position shown in FIG. 4. The same position is shown in FIG. 13 with finger 53 at its disengaged position (shown by the dotted lines). The object 57 would, of course, not be present.

Figure 19:
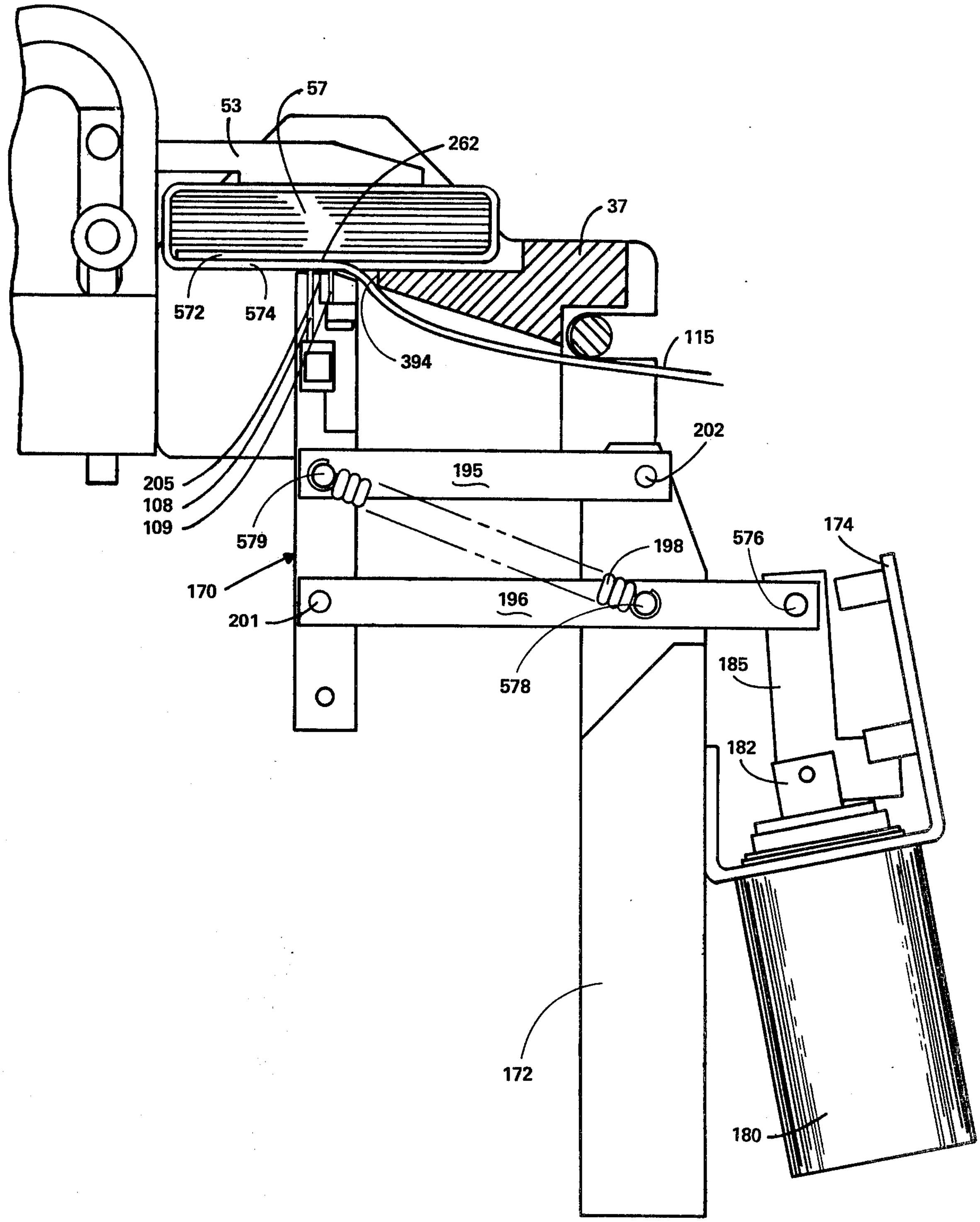
FIG. 19 is a detailed drawing of the operation of a strap severing and sealing tool of the present invention.

Severing and sealing tool 170 as shown in FIG. 19 is urged upward by solenoid 180 mounted bracket 174 attached to spar 172. Shaft 182 is withdrawn into solenoid 180 which moves L-shaped member 185, which is attached to arm 196 by bolt 576, downward and causes the parallel arms 195 and 196 to pivot about pivot points formed by bolts 202 and 578 with spar 172. Another set of parallel arms similar to arms 195 and 196 could be located on the other side of spar 172. The parallel arms cause a relative pivoting between the arms 195 and 196 and tool 170 about bolts 579 and 201, respectively. Spring 198 as discussed above acts to urge tool 170 downward to provide force to move the head 205 of tool 170 away from the strap 115 within notch 394. Spring 198 is attached between bolts 578 and 579. The overlap portion of the strap 262 has the wires 108 and 109 which traverse the head 205 engaged with the strap 115 along its overlapping portion 262. More particularly, the wires 108 and 109 are engaged with the outer layer 574 of the overlapping portion 262. The strap is pulled downward over wire 109.

Electrical energy supplied to wires 108 and 109 causes them to emit heat softing the thermol plastic material which comprises strap 115. This melts very limited portions of the strap without decomposition. The tension which is applied to strap 115 by roller 90 pulls the strap apart, i.e., severs the strap, along the segment of the overlapping portion which wire 109 traverses. Wire 109 traverses the head such that it extends across the width of the strap. Wire 108 melts the portion of the strap in contact with it, i.e., the outer layer 574 which causes it to fuse with the inner layer 572. Although this particular type of severing and sealing operation is shown, various others such as cutting strap 115 with a knife, etc., could be employed within the present strapping mechanism.

Figure 20:
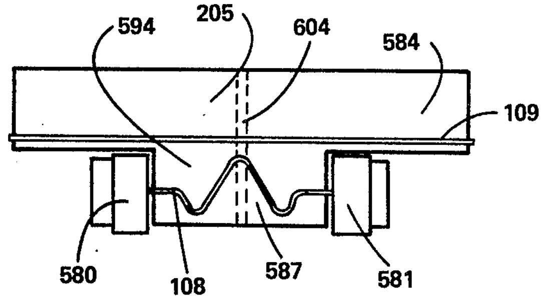
FIG. 20 is a top view of the head of the severing and sealing tool of FIG. 19.

The structure of head 205 is shown in detail in FIG. 20. Wire 109 traverses the head 205. Head 205 could be of a much wider distance than the width of the strap but it is only necessary that the wire 109 be in contact with the strap across its width at some location. Thus, once a certain area of the head is predetermined as the area within which the head contacts the strap, it is only necessary that wire 109 cross that area and that the length of the wire need only be sufficient that it contact the strap across its entire width. Wire 108 on the other hand meanders through the predetermined area in which the head tool 205 contacts the strap, although it is preferable that wire 108 not extend across the entire width of the strap. Wire 108 performs the sealing function while wire 109 cuts the strap. Connectors 580 and 581 each receive an end of wire 108 and not only hold the wire in position across the head 205, but also provide a contact terminal for connecting the wire 108 to its power supply. It may also be desirable for some applications to have a nonconducting material over the wires and the head such as glass-filled Teflon tape (not shown) which provides for a more even distribution of the heat to the strap 115 and prevents residue from the strap adhering to the wires and head.

Figure 21:
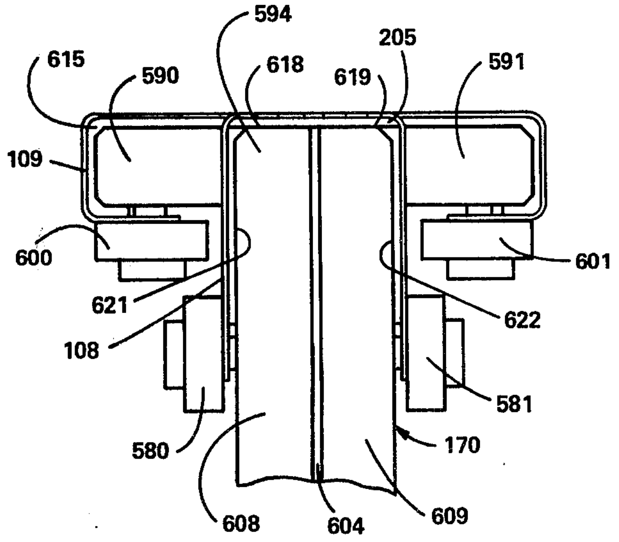
FIG. 21 is a front view of the severing and sealing tool shown in FIG. 19.

As shown in FIG. 20, the upper surface of head 205 has a T shape. The longer portion 584 of head 205 extends away from the leg 587 of the T, comprising head 205. As shown in FIG. 21, ears 590 and 591 extend away from the body 594 of the tool 170. Ears 590 and 591 (FIG. 21) are elongated box shape structures extending outward from body 594 to form the T shaped structure of the head 205 as shown in FIG. 20. Wire 108 as shown in FIG. 20 is disposed upon head 205 in a W shape although any suitable shape such as a zig-zag or various loops could be utilized. In FIG. 21, wire 108 is connected via connectors 580 and 581 to body 594. Wire 109 is also connected to body 594 by connectors 600 and 601 which are located on the underside of ears 590 and 591.

It is preferable to form the body 594 and ears 590 and 591 out of a heat-conducting metal to form a heat sink, although not absolutely necessary to do so.

The wires 108 and 109 could be connected by connectors 580 and 581 and 600 and 601 to a power source directly. However, if as shown herein, the body and ears are formed of a electrically conductive material, connectors 580 and 501 can connect wire 108 directly to body 594 and connectors 600 and 601 can connect 109 directly to ears 590 and 591, respectively. It is, of course, then necessary to construct the head so as to provide a proper electrically conductive path. This is accomplished by providing body 594 with a Teflon layer 604. A shown in FIG. 20, the Teflon layer 604 passes completely through body 594 and thereby separates the structural bars 608 and 609 by an insulating layer, i.e., layer 604. Since ears 590 and 591 are integral parts of the body 594 and are only extensions of the material thereof, ear 590 is separated from ear 591 by the insulating Teflon layer 604.

Wires 611 and 612 (FIG. 23) which are connected at one end to structural bars 608 and 609, respectively, provide an electrical circuit which travels from wire 611 through structural bar 608, through electrically resistive wires 108 and 109 in parallel, and finally through structural bar 609 to wire 612. In order to provide the desired electrical circuit, it is necessary that wires 108 and 109 be insulated from ears 590 and 591 and body 594 along the lengths thereof away from connectors 580, 581, 600, and 601. In order to accomplish this, a second insulating layer 615 is provided around ear 590 over the otp surfaces 618 and 619 of structural bars 608 and 609 and over and around ear 591. Layer 615 also extend downward along the sides 621 and 622 of structural bars 608 and 609, respectively, to insulate wire 108 from the structural bars. Thus, the layer 615 is disposed between wire 109 and ears 590 and 591 and body 594. Also, the layer 615 is disposed between wire 108 and body 594. It should be understood that as discussed herein head 205 includes layer 615. Thus, once head 205 is engaged with the overlapping portion 262 of the strap 215 (FIG. 19), electricity is applied through wires 611 and 612 (FIG. 23) to cause wires 108 and 109 to increase in temperature and by conduction heating soften the outer layer 574 (FIG. 19) of the overlapping portion 262. Then tension is applied to strap 115 by roller 90 when strap 115 is pressed against roller 90 by roller 113 (FIG. 2). The softening or melting of strap 115 causes the strap to part (or sever) along the section in contact with wire 109. This end is pulled away from the area adjacent to platen 37 and toward the feeder mechanism 71. The severed end passing adjacent to sensor 143 is detected and solenoid 93 disengaged.

The power supply to bars 108 and 109 is deactivated but solenoid 180 remains actuated so that the inner and outer layers of overlapping portion 262 have time to seal together, i.e., cure prior to the removal of the pressure of head 205 against the overlapping portion 262. In particular, the pressure of the head 205 against outer layer 574 forcing the inner layer against object 57 is maintained.

After a sufficiently long time to promote the seal of the material of strap 115 in the overlapping portion 262 adjacent to wire 108, solenoid 180 is activated to cause the shaft 182 to move outward and the tool 170 to move away from the object 157. The inner and outer layers, 572 and 574 have where in contact (adjacent) the wire 108 fused together because the thermoplastic material of strap 115 has melted. The desired temperature is within the range sufficient to melt and soften the strap but not high enough to cuase decomposition. Strap 115 can be constructed of any suitable thermoplastic material such as Tyvec (a trademark of Dupont) plastic. A heat sensitive adhesive could be applied to strap 115 such that the surfaces of the layers in contact have the adhesive thereon.

Figure 22:
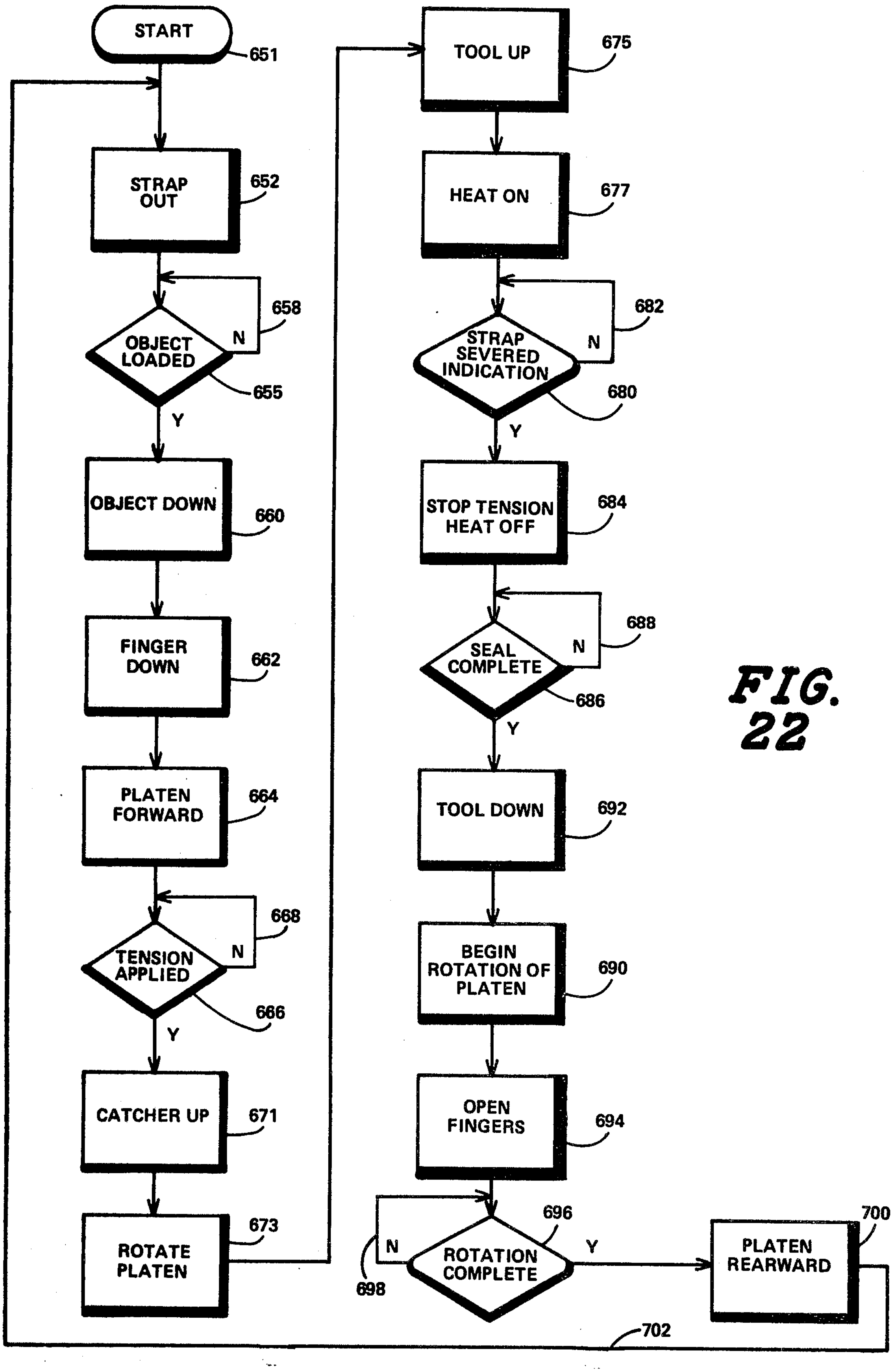
FIG. 22 is a flow diagram of the operation of the strapping apparatus and the tool of the present invention.

FIG. 22 shows a flow diagram for the various functional steps of a control system for utilization with the strapping apparatus of the present invention from starting with the initialization logic step 651. In order to achieve the condition for step 651, standard initialization procedures must be contained within the controller; for example, various flip-flops and counters being set to the initial state. From step 651 the logic goes to logic step 652 where the solenoid 93 (FIG. 2) is actuated to press roller 113 against strap 115. From step 652 the logic proceeds to logic state 655 in which, if an object-loaded signal is not received, logic cycles through path 658 and reenters state 655. When the object-loaded signal is received, the logic proceeds from state 655 to logic step 660. At logic step 660 the object is placed on the platen.

The logic then onto logic ontologic step 662 where the fingers are engaged with the object. Logic then proceeds onto logic step 664 where the platen is moved from its rearward (first) position to its forward (second) position. From logic step 664 the logic enters state 666. Solenoid 93 is actuated in state 666 to force strap 115 against roller 90 and motor 77 is actuated to rotate roller 90 in a clockwise (FIG. 2) direction.

During state 666, sensor 115 is sensed to determine if tension has indeed has been applied to strap 115. If tension is not applied, the logic cycles through path 668 and reenters state 666. If tension is applied to the strap, the logic goes from state 666 to step 671 where the catcher is raised upward to a position for receiving another object. It is preferred to raise the catcher at this point in the logic sequence; however, it is not necessary to do so and the catcher can be raised any appropriate time to receive the object. From step 671 logic enters step 673 where the platen is rotated to wrap the object with the strap. Step 673 is followed by step 675 during which the sealing tool is moved upward to come into contact with the overlapping portion of the strap. In step 677, which is the next logic step after step 675, energy is applied to the severing and sealing tool. After energy is applied to the tool in step 677, the logic continues on and enters logic state 680. If a strap severed indication is not received from sensor 127, the logic recycles through path 682 and reenters state 680. If an indication that the strap is severed is received while logic is in state 680, logic proceeds through step 684 to logic state 686. The tension applied to strap 115 is discontinued in step 684 and the current applied to wires 108 and 109 is turned off. If during step 686 the seal is not complete, logic recycles through path 688 and reenters state 686. If the seal is complete, i.e., logic proceeds to logic state 690 through step 692 and logic step 692, the severing and sealing tool is lowered. In step 690, motor 53 is activated, and the platen is begun to be derotated. From step 690, the logic proceeds via logic step 694 on to logic state 696. Within logic step 694 the fingers are opened. In logic state 696 a test is made via a sensor (not shown) to determine if the rotation of the platen is complete. If the rotation is not complete, the logic cycles through path 698 and reenters state 696. If the rotation is complete, the logic proceeds through step 700 and returns to step 652 via logic path 702. During step 700 the platen is moved to its rearward most position. The logic diagram of FIG. 22 is discussed here below in connection with the operation of the invention of the present application; however, it should be noted that the flow diagram of FIG. 22 is by way of example only and can be changed. For example, in certain applications, it may be desirable to deactuate the current to wires 108 and 109 only after an interval of time has elapsed subsequent to the severing or the current to wire 108 might be applied at times different from the application of current to wire 109.

Figure 23:
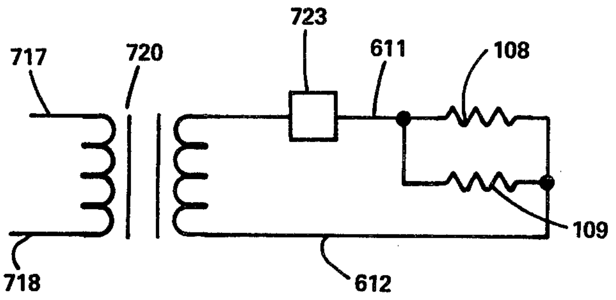
FIG. 23 is a schematic diagram of power supply for the wire resistive elements of the severing and sealing tool of FIG. 19.

In FIG. 23, lines 717 and 718 are connected to an AC power supply at one end and at the other opposite end to a transformer 720. One tap of the transformer 720 is connected to one side of electrically resistive wires 108 and 109 via wire 611 through a switching device 723. The other tap of transformer 20 is connected to wire 612 and thereby to the other side of electrically resistive wires 108 and 109.

In operation, solenoid 93 is actuated urging roller 113 against roller 90 while roller 90 is being rotated in a conterclockwise direction (as shown in FIG. 2) by motor 77. This pushes strap 115 through guide 125 over nib 402 (FIG. 1) and disposes the end 123 of the strap 115 within notch 394. The solenoid 93 is deactuated after the strap end 123 is disposed adjacent the mouth 399 of notch 394 (FIG. 1). This is the operation performed within logic step 652. A sensor (not shown) associated with catcher 129 senses when an object is loaded into the straight portion 131 (FIG. 4) of catcher 129. The output of the sensor associated with catcher 129 determines whether the logic recycles through path 658 or continues onto step 660. In step 660 support 136 (FIG. 4) pivots and moves the catcher 129 downward and straight portion 131 comes into contact with plates 384 and 385 (FIG. 1). In order for catcher 129 to properly position the object 57 on the platen 37, it is necessary that the straight portion of the catcher be forked with each section of the fork being disposed on the other side of the U-shaped structure 390. A notch (not shown) also extends from straight portion 131 along the catcher so as to allow the straight portion 131 to actually contact the plates 384 and 385 (FIG. 1).

After the object 57 is properly positioned, the logic enters state 662 and the motor 503 is actuated. Motor 503 causes the fingers to pivot and move downward in the cam action discussed above which brings fingers 53 and 54 into contact with the upper surface of object 57. During step 664, motor 220 is actuated to move the carriage frame 216 and platen 37 forward away from catcher 129.

After the platen has been moved forward, the logic proceeds to state 666 wherein the motor 77 rotates roller 90 in a clockwise direction (as shown in FIG. 2) and solenoid 93 is actuated to urge roller 113 downward toward roller 90 with strap 115 there between for providing tension on strap 115 between the feeder 71 and object 57. If sensor 143 does not detect the tension applied, the logic recycles until the tension is applied. After sensor 143 detects that the tension is applied, the catcher is then moved upward to its initial position. This step can take place anytime after step 664 and prior to step 652 in the loop formed by path 702.

The platen 37 and the clamp 50 are then rotated by actuating motor 537 in a clockwise direction (as shown in FIG. 2) as described in connection with FIGS. 8 through 12. After the platen is rotated a full turn during step 673, the solenoid 180 (FIG. 2) is actuated to move the tool 170 up against the overlapping portion 262 of the strap 115 (as shown in FIG. 4). This is logic step 675. After the sealing tool is in position with its head 205 against the strap switch 723, switch 723 responsive to the control means is actuated to supply electrical power to electrically resistive wires 108 and 109 which is the function of step 677.

After the strap 115 is severed and then pulls away from the overlapping portion 162 by roller 90 and that end is detected by sensor 127, the logic goes onto step 684 from state 680 wherein solenoid 93 is deactuated and roller 113 disengages from roller 90 and switch 723 is deactuated. In state 686, which follows step 684, the logic is delayed by cycling through path 688 until sufficient time has passed after the heat to tool 170 is turned off by switch 723 in order to insure that the thermoplastic material adjacent wire 108 has cooled enough for the inner and outer layers of the overlapping portion 262 to harden and be sealed together. In other words, the seal is cured. Once the delay is complete, the logic proceeds to step 692 wherin solenoid 180 is deactuated and the tool moved downward away from the overlapping portion 262. This is the position for the tool 170 as shown in FIG. 2. During step 690, which follows step 692, motor 537 is actuated so that shaft 40 rotates in a counterclockwise direction (as shown in FIGS. 1 and 3). The platen and clamp are rotated. In step 694 motor 503 is actuated to rotate shaft 46 in a counterclockwise direction (as shown in FIGS. 1 and 3). This causes fingers 53 and 54 of clamp 50 to move away from platen 37 in their respective slots 430 and 455 (FIG. 1). This allows the object to fall from the platen as shown in FIGS. 15 and 16. The derotation of the platen and the clamp are shown generally in FIGS. 13 through 17. A sensor (not shown) detects when the rotation is complete through one full turn. Until that signal is received, the logic cycles from state 696 through path 698 back to state 696. When the rotation complete signal is received, the logic enters state 700 where motor 220 is actuated to cause linear drive 232 and its associated shafts, bearings, bars, rods, etc. to move carriage frame 216 rearward toward catcher 129. With the platen rearward and derotated, the system is now prepared to recycle through path 702 and reenter the initial state 652. It should be noted that the initial step 652 is one wherein solenoid 93 is actuated to force roller 113 downward against roller 90 and motor 77 is actuated to rotate roller 90 in a counterclockwise (as shown in FIG. 2) direction.

In summary, the severing and sealing tool of the present invention has a head with two electrically resistive wires disposed thereon. The head is moved into contact with an overlapping portion of the thermoplastic material of the strap with the layer of the material in contact with the head under tension. Current is supplied to the wires to raise the temperature of the material within its softening range. The tension applied pulls the material apart, i.e., severs it, along one of the resistive wires located toward the source of the tension from the other wire. The current is cut off by a switch after the material severs, but the tool remains in contact with the material until the segment of the material adjacent the other wire hardens, i.e., the seal is allowed to cure.

Having described the invention in connection with certain specific embodiments thereof, it is to be understood that further modifications may now suggest themselves to those skilled in the art. It is intended to cover all such modifications which fall within the scope of the appended claims.

What is claimed is:

1. Tool for severing and sealing a plastic strap of a certain width, said strap having one end in contact with an object, and extending about said object and over said one end to form an overlapping portion of said strap adjacent said one end, said overlapping portion including an inner layer in contact with said object and an outer layer in contact with said inner layer, said strap extending from said overlapping portion to another opposite end to said one end thereof adjacent a supply of said strap, comprising:

- a body including a flat head to contact said outer layer of said overlapping portion within a predetermined area of said head;
- a first resistive wire heating element extending across said predetermined area and having a length at least said certain width;
- a second resistive wire heating element extending meanderously within said predetermined area disposed between said first heating element and said one end, when said head contacts said outer layer;

a power source for selectively supplying electricity to said first and second heating elements when said head is in contact with said outer layer to soften portions of said outer layer adjacent said first and second heating elements;

a tension means coupled to said strap intermediate said overlapping portion and said another end providing tension on said strap about said object for pulling the portion of said strap adjacent said first heating element toward said another end away from said overlapping portion to sever said strap after said first heating element softens the portion of said outer layer adjacent said first heating element; and a switch connected to deactuate said power source after said tension means severs said strap.

2. Tool for severing and sealing a thermoplastic strap comprising:

a movable body provided with a flat heat;

a motor attached to said body to move a predetermined area of said head into contact with said strap;

a first electric resistive wire attached to said body and extending across said predetermined area;

a second electric resistive wire attached to said head and meandering within said predetermined area;

a power source connected to said first and second resistive wires to selectively heat said resistive wires to an operating temperature within the softening range of the thermoplastic strap; and a switch means operatively connected between said power source and said wires to selectively supply power to said wires.

3. A tool for severing and sealing an overlapping portion of a thermoplastic strap having a certain width, said overlapping portion having an inner and outer layer, said outer layer being under tension, comprising:

a body having a flat head moveable into contact with the outer layer of said overlapping portion;

a first electrically resistive wire extending across said head and in contact with a certain width of said strap when said head is in contact with said outer layer;

a second electrically resistive wire meandering over a portion of said head and in contact with said outer layer when said head is in contact therewith; and a power source supplying current to said first and second resistive wires to heat said wires to a temperature within the softening range of said strap.

4. Tool as set forth in claim 3 wherein said body is metallic to provide a heat sink.

5. Tool as set forth in claim 4 wherein said body has two parts divided by an insulating layer.

6. Tool as set forth in claim 5 wherein a first end of each resistive wire is attached to one part of said body, and a second end of each resistive wire opposite to said first end thereof attached to another part opposite to said one part of said body.

7. Tool as set forth in claim 6 wherein said resistive wires are separated from said one part and said another part of said body by an insulating layer.

8. Tool as set forth in claim 7 wherein said power source is connected to said one part and said another part of said body to form a complete electrical circuit through said resistive wires.

* * * * *